June 12, 1962  E. E. ROTH ETAL  3,038,615
UNLOADING APPARATUS FOR MATERIAL HANDLING SYSTEMS
Filed April 17, 1957  9 Sheets-Sheet 2

INVENTORS:
ERNEST E. ROTH
HENRY E. TANNER
By Gravely, Lieder, Woodruff and Wills
ATTORNEYS.

June 12, 1962 E. E. ROTH ETAL 3,038,615
UNLOADING APPARATUS FOR MATERIAL HANDLING SYSTEMS
Filed April 17, 1957 9 Sheets-Sheet 3

INVENTORS:
ERNEST E. ROTH
HENRY E. JANNER

By Gravely, Lieder, Woodruff and Wills
ATTORNEYS.

June 12, 1962 E. E. ROTH ETAL 3,038,615
UNLOADING APPARATUS FOR MATERIAL HANDLING SYSTEMS
Filed April 17, 1957 9 Sheets-Sheet 4

INVENTORS:
ERNEST E. ROTH
HENRY E. TANNER

By Gravely, Lieder, Woodruff and Wills
ATTORNEYS.

June 12, 1962    E. E. ROTH ETAL    3,038,615
UNLOADING APPARATUS FOR MATERIAL HANDLING SYSTEMS
Filed April 17, 1957    9 Sheets-Sheet 5

INVENTORS:
ERNEST E. ROTH
HENRY E. TANNER
By Gravely, Lieder, Woodruff and Wills
ATTORNEYS.

United States Patent Office 3,038,615
Patented June 12, 1962

3,038,615
UNLOADING APPARATUS FOR MATERIAL HANDLING SYSTEMS
Ernest E. Roth, Arnold, and Henry E. Tanner, St. Louis, Mo., assignors to Alvey Conveyor Manufacturing Company, St. Louis, Mo., a corporation of Missouri
Filed Apr. 17, 1957, Ser. No. 653,359
5 Claims. (Cl. 214—8.5)

The present invention relates to systems for the handling of articles, and more particularly to a method and apparatus for unloading articles, such as cartons, boxes, cases and the like, from a portable lift truck storage platform.

The use of pallets, skids and other portable platforms to support articles, parcels, cartons or other objects placed thereon has been found a convenient means to facilitate shipping, storage and handling of many types of goods. The goods can be arranged on the portable load supporting platform in any of a variety of arrangements as a single unit or as patterned layers or tiers depending upon the nature and physical characteristics thereof and may readily be picked up and transported from one point to another while loaded.

The loaded platforms are frequently transported to an unloading point where the goods are unstacked and placed on a conveyor system. This operation has heretofore been time consuming and has required considerable labor.

Various means have heretofore been suggested for mechanizing the unloading of portable platforms. In general, these means have been unsatisfactory for one reason or another. Frequently, the prior machines have been too complicated and expensive for efficient and economical operation in average and small sized plants. Furthermore, the prior machines have been complicated and costly to construct and maintain and have had the further disadvantage of being difficult to adjust so that a machine that has been handling goods of one size and shape cannot easily be made to handle goods of a different size and shape. Where fragile goods such as bottled products are being handled, it is also essential that the handling equipment operate safely and reliably to prevent damage to the goods, since breakage of bottled goods causes lost time and usually results in blocking an entire system until cleaned up.

A principal object of this invention has been to provide an improved apparatus for unloading goods or objects from a portable platform, which overcomes the objections and disadvantages of known apparatus employed for this purpose.

Another object is to provide a relatively inexpensive, safe operating, reliable and efficient apparatus for unloading portable article-carrying platforms.

Another object of the invention is to provide storage platform or portable pallet unloading apparatus which is adapted to cooperate with a conveyor system in the unloading of goods and which automatically maintains a continuous flow of the goods being unloaded and separates the platforms or pallets from the system handling the goods.

Another object of the invention is to provide in a portable platform unloading apparatus, means for automatically stacking the unloaded platforms.

Another object is to provide a control system for a portable platform unloading apparatus which includes safety features to prevent damage to the goods being unloaded, to the apparatus, and to the operator.

Another object is to provide a portable platform unloading apparatus with new and novel operating means adapted to handle cartons or other objects of different sizes and shapes without adjustment or with a minimum of adjustment.

Another object of the invention is to provide apparatus for unloading layers or tiers of articles from a portable platform or pallet regardless of the pattern arrangement of the articles in the layers and regardless of the number of layers.

Another object of the invention is to provide an unloading apparatus for portable platforms such as pallets which gently handles the goods, objects or cartons being unloaded from the platform without damage thereto and which is capable of handling various shapes and sizes of objects, cartons, etc. simultaneously.

Still another object is to incorporate into a fully automatic portable platform unloading apparatus, manual controls for selectively cycling, performing, and testing individually the separate machine functions.

A still further object is to provide an apparatus of the character indicated which is simple enough to be understood and operated even by relatively unskilled persons.

The more important features of this invention include novel and improved gripper clamp members capable of holding and supporting, without damaging, and without a platform therebeneath, one or more tiers of cartons or other objects; means for automatically unloading and stacking portable platforms or pallets, means for the orderly discharge of the unloaded cartons or other objects from the apparatus, and means for integrating the aforementioned features to provide a fully automatic unloading apparatus of the character indicated.

Other objects, features, and advantages of the invention will become apparent from the following description of the invention in conjunction with the accompanying drawings.

In the drawings:

FIG. 3 is a side elevational view showing the opposite side of the same apparatus taken along line 3—3 in FIG. 1, FIGS. 4 through 9 show in step-by-step sequence the operations employed by the present apparatus to unload a portable platform, to stack the unloaded paltform, to support the articles being unloaded, and to separate the stack of articles layer-by-layer so that the layers may be reduced to a flow in a desired path of the articles therein.

Referring now to the drawings and more particularly to FIGS. 1, 2, 3, and 4 thereof, there is illustrated apparatus 30 for unloading portable platforms such as pallets 32, for stacking the unloaded pallets 32, and for separating the articles taken off the pallets 32 (such as cartons 34) for more conveniently handling the same or for performing later operations thereon. The operations will be described, as nearly as possible, in the order in which they take place when the machine is operating automatically. From time-to-time it may prove helpful to refer to the sequence chart shown in FIG. 25 for the proper time motion relationship of the various operations.

Figure 4:
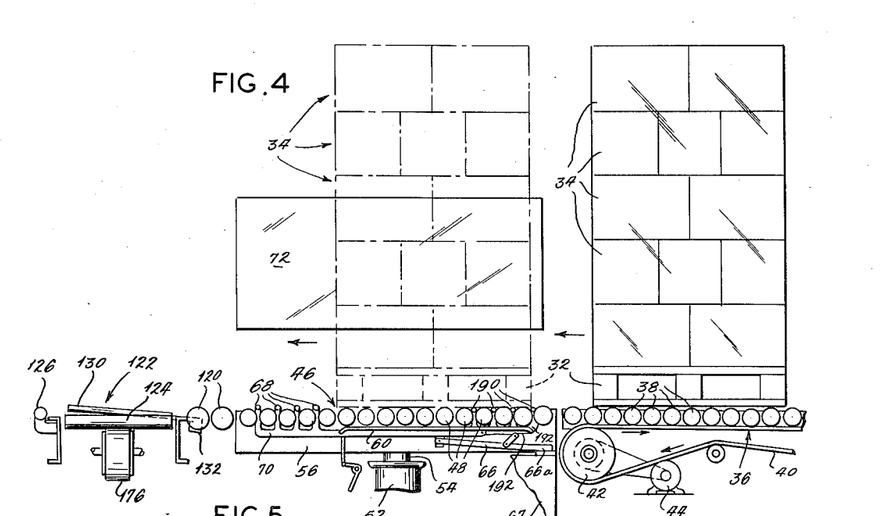

FIGS. 4 through 9 show the steps performed by the apparatus 30 to unload a pallet 32. In FIG. 4, a loaded pallet is moving from a position on an input conveyor 36 (solid lines) to a position on an elevator 46 (phantom lines).

Figure 5:
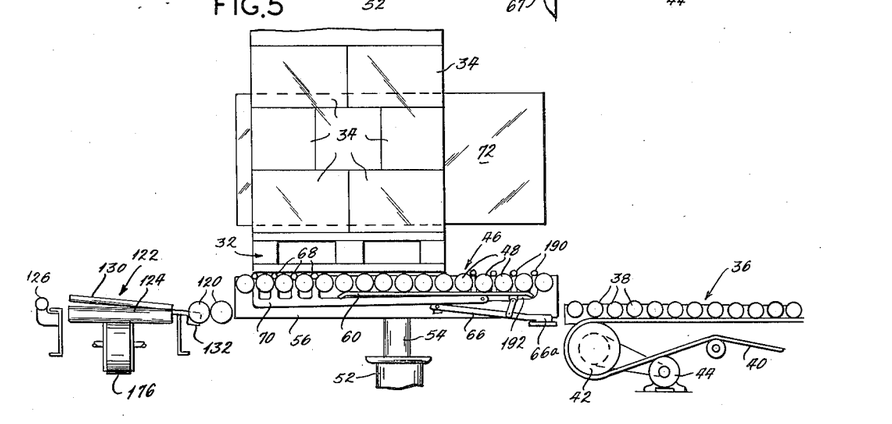
Figure 6:
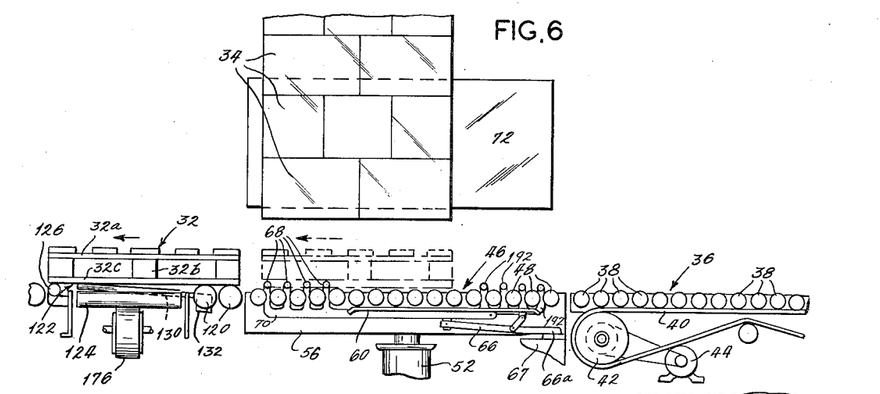
Figure 7:
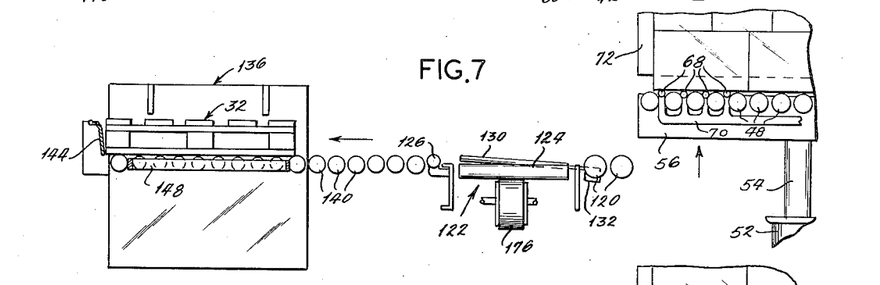
Figure 8:
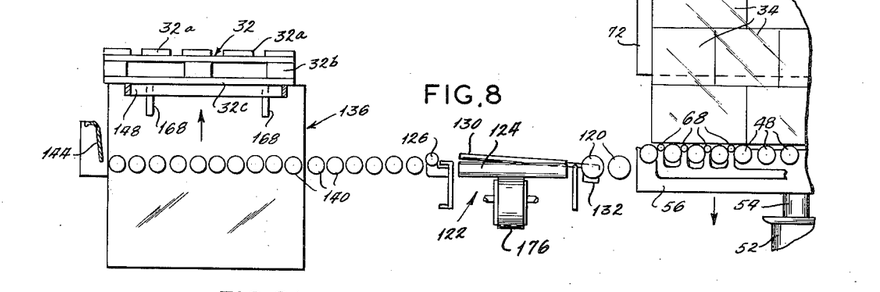
Figure 11:
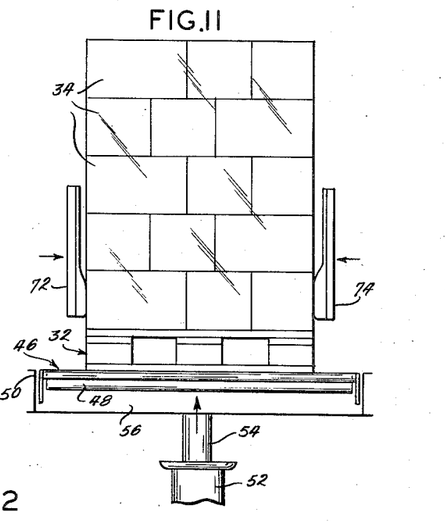

When the pallet has advanced on the elevator 46 to a predetermined position, a fluid pressure hoist 52 associated with the elevator 46 is energized and moves the elevator upwardly (FIG. 5). The elevator rises to a predetermined position and stops. While stopped, clamps 72 and 74 which are pivotally mounted on opposite sides of the elevator 46 move in and engage the lowest tier of cartons 34 (FIGS. 6 and 11). The clamps 72 and 74 apply sufficient pressure to support the cartons in their elevated positions and the elevator is able to lower with only the pallet 32 positioned thereon. When the pallet 32 has been lowered (phantom in FIG. 6), the rolls 48 which form the platform bed of the elevator 46 are driven and advance the pallet 32 leftwardly across a carton discharge bed 122 and into a pallet stacker 136. While the pallet 32 is being stacked by the stacker 136 (FIGS. 7 and 8), the elevator 46 rises to a position engaging the underside of the bottom tier of cartons 34. The clamps 72 and 74 then separate releasing the cartons on the elevator 46, and the elevator 46 lowers one carton height and stops long enough for the clamps 72 and 74 to come together and engage the second lowest tier of cartons 34 (FIG. 8).

Figure 9:
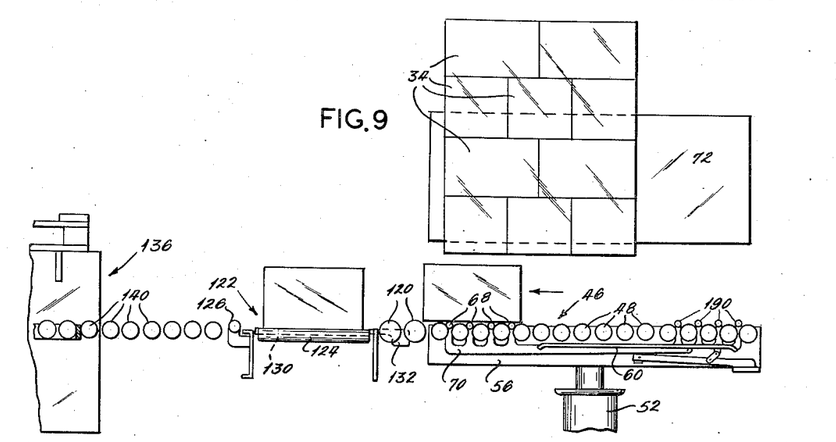

With the clamps 72 and 74 supporting the second lowest tier (and all the tiers thereabove), the elevator 46 again descends with the lowest tier and discharges the lowest tier, one row at a time, into the discharge bed 122 (FIG. 9). Following is a detailed description of the construction and operation of the mechanism which performs the above functions.

*Input Conveyor*

Loaded pallets 32 (FIGS. 4 and 5) are fed into the apparatus 30 on powered input conveyor 36. By powering the input conveyor 36 the time at which the loaded pallets enter the unloading stations of the apparatus 30 is controlled thereby saving time and preventing bottlenecks and jams. It is anticipated, however, that a gravity feed or some other known feeding device could be used instead of the conveyor 36 as long as provision is made to prevent loaded pallets 32 from prematurely entering the unloading portions of the apparatus 30 when it is occupied.

The input conveyor 36 (FIG. 1) has two parallel tracks of rolls 38, one track being provided to accommodate each side runner of the pallets 32. The rolls 38 are suitably spaced along their respective tracks and the rolls 38 on one track are driven from below by a drive belt 40 mounted on spaced drive rolls 42. A drive motor 44 (FIGS. 4, 5 and 6) is mounted below the input conveyor 36 for driving the belt 40.

*Elevator*

Loaded pallets 32 advance to the right on the input conveyor 36 (FIGS. 1 and 3) and are fed onto the elevator 46. The elevator 46, as the name suggests, moves up and down and has a plurality of the spaced rotatable elevator rolls 48 mounted between side members 50. When receiving loaded pallets 32, the elevator 46 is in its down or home position and the rolls 48 are in the plane of the input conveyor 36 (FIG. 4). A loaded pallet as that term is used herein consists of the pallet or skid 32 having a plurality of vertically arranged layers or tiers of cartons 34 or other objects positioned thereon. Many arrangements can be made both of the layering of the cartons 34 in the several tiers, and of the number of tiers themselves. Also, a pallet with a single object or carton can be unloaded by the present apparatus. For purposes of this disclosure, however, seven carton tiers will be considered with the cartons arranged to form a rectangle in each tier, with the tiers having three cartons positioned side-by-side and four cartons in pairs positioned end-to-end. By staggering or alternating the pattern of the carton arrangement in adjacent tiers the load is made more stable.

Figures 1, 20:
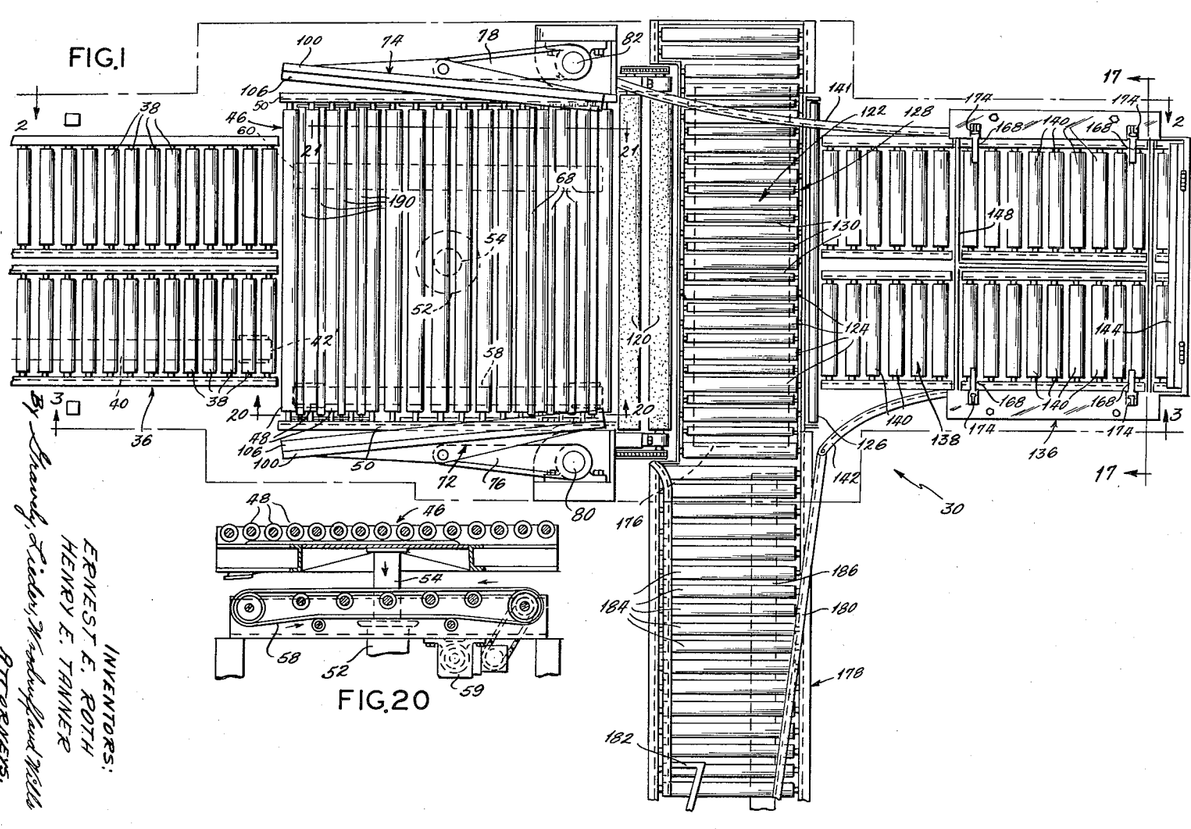
FIG. 1 is a schematic plan view from above showing one form of an unloading apparatus constructed according to the present invention.
FIG. 20 is a fragmentary cross-sectional view showing the drive mechanism for the feed rolls on the elevator and taken along line 20—20 in FIG. 1.
Figure 22:
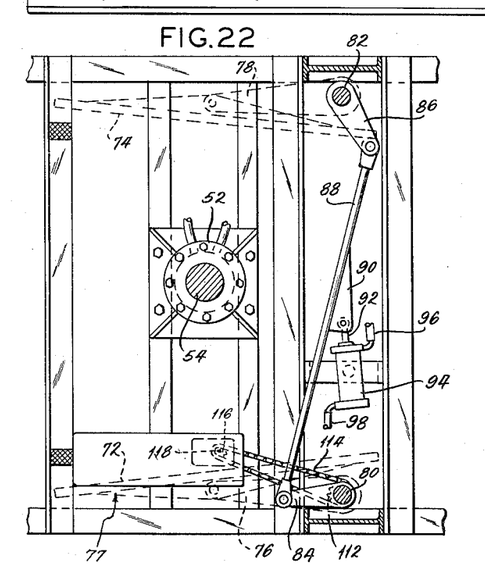
FIG. 22 is a horizontal cross-sectional view of the controls for the article gripping members taken along line 22—22 in FIG. 19, the gripping members being shown in phantom.

The elevator 46 is supported on and moved by a hydraulic hoist 52 (FIGS. 4 and 22). The hoist 52 has a vertical shaft member 54 which extends upwardly and is attached to elevator supports 56. When the elevator 46 is in its down or home position, the elevator rolls 48 engage and are driven from below by a drive belt 58 powered from motor 59 (FIG. 20).

Figure 21:
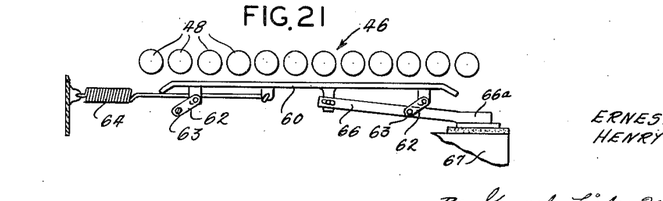
FIG. 21 is a fragmentary side elevational view of the brake shoe mechanism associated with the elevator for stopping the elevator feed rolls, the view being taken along line 21—21 in FIG. 1.

As soon as the elevator 46 rises above its down position, the rolls 48 move out of engagement with the belt 58 and instead are engaged by a brake shoe 60 which is operatively mounted on the platform structure and moves up and down with it. The brake shoe 60 and associated mechanism are shown generally in FIG. 4 and in detail in FIG. 21. The shoe 60 is pivotally mounted on links 62 which rotate about transverse shafts 63. A biasing spring 64 is connected to one end of the shoe 60 and pulls the shoe 60 to the left thus causing it to rise on the links 62 into engagement with the lower surfaces of the rolls 48, forming the load supporting area of the elevator 46. Also connected to the shoe 60 is an operating arm 66 which is pivoted on the same shaft 63 as righthand shoe links 62. When the elevator 46 is down, the right end of the operating arm 66a (FIG. 21) engages the frame 67 of the apparatus 30 and is moved upwardly in a counterclockwise direction, thereby disengaging the shoe 60 from the rolls 48 and permitting belt 58 to turn them. When the elevator 46 rises, the arm 66 is released and the spring 64 moves the shoe 60 to the left and upwardly into engagement with the rolls 48. Therefore, when the elevator 46 is down in its home position, as it is when a loaded pallet 32 is entering thereon, the brake shoe 60 is inoperative and the rolls 48 are driven by belt 58 and move the pallet 32.

When the pallet 32 has moved onto the elevator 46, it engages two separate switch actuating devices (FIGS. 4, 19 and 24), one of which signals the hoist 52 for the elevator 46 to rise. The switch actuating devices consist of a plurality of small transverse rolls 68 and 190 which are positioned extending transversely across the elevator 46 between the elevator rolls 48 (FIGS. 1 and 4). The rolls 68 are positioned near the forward or discharge end of the elevator 46 on spaced pivotal arms 70, and the rolls 190 are positioned near the rearward or input end of the elevator 46 on pivotal arms 192. Both sets of rolls 68 and 190 are either spring biased or counterbalanced (not shown) to extend above the rolls 48. It is also contemplated that other forms of proximity indicating means such as photocells or switching devices could be used instead of the switch actuating devices shown.

When either a pallet 32 or a carton 34 is positioned on the elevator 46 over the rolls 68 or 190, the rolls 68 or 190 move downwardly level with the rolls 48. The downward movement thereof moves the associated arms 70 or 192 downwardly and operates control switches RSW-1 or RSW-2 (FIG. 24) which are mounted under the bed of the elevator 46 and which are associated with the arms 70 and 192 respectively. Operation of the control switch RSW-1 energizes the hoist 52 which then moves the loaded elevator 46 upwardly. As soon as the elevator 46 rises, the brake shoe 60 carried by the elevator 46 engages the rolls 48 and stops the forward movement of the loaded pallet.

Figure 19:
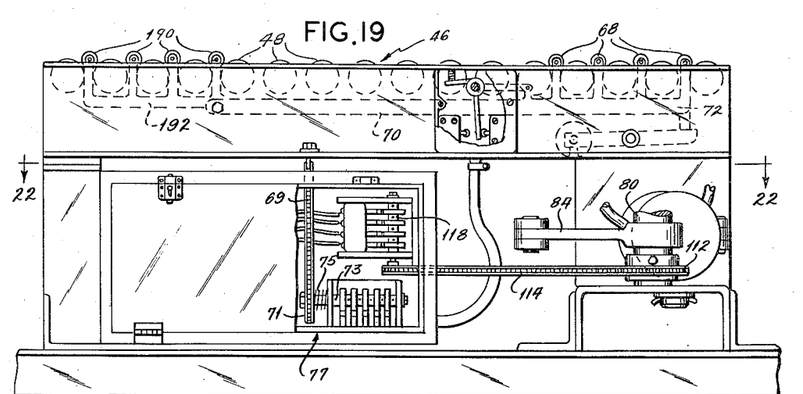
FIG. 19 is an enlarged fragmentary view, partially cut away, taken from the same side of the apparatus as FIG. 3, and showing in greater detail a portion of the controls for the article gripping members and for the elevator.
Figure 27:
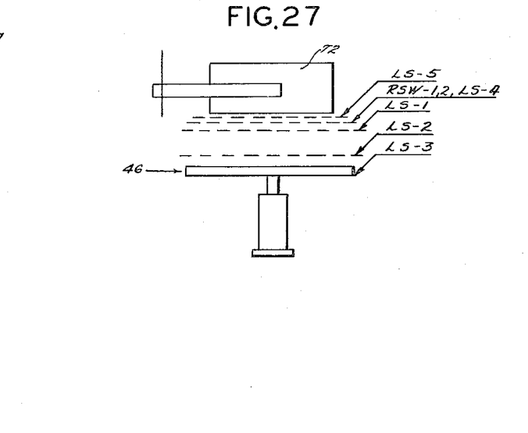
FIG. 27 is a schematic elevational view showing in dotted lines the positions of the elevator at which its associated limiting switches operate.

The elevator 46 continues to rise, as above described, until stopped by another limit switch which is controlled by the movement of the elevator 46 and which de-energizes the hoist 52. While the elevator 46 is rising, a link chain 69 which is connected at one end to the frame of the elevator 46 (FIG. 19) is pulled upwardly and the opposite end of the chain 69 which is wrapped around a sprocket gear 71 rotates a cam shaft 73 in a control unit 77 (FIG. 19). A plurality of cams mounted on the cam shaft 73 operate associated limit switches (LS switches 1, 2, 3, 4 and 5) which are timed to control various operations of the device (FIG. 27). A spring 75 is mounted on cam shaft 73 to restore the shaft 73 by rewinding the chain 69 on gear 71 as the elevator 46 lowers.

*Clamps*

When the elevator 46 is in its raised position, clamps 72 and 74, which are pivotally mounted in pillars forming part of the frame of the apparatus and located on opposite sides thereabove, are energized to pivot or move inwardly against opposite sides of the lowest tiers of cartons 34. The mechanism which controls the operation of the clamps 72 and 74 is shown in FIGS. 19 and 22.

Figure 2:
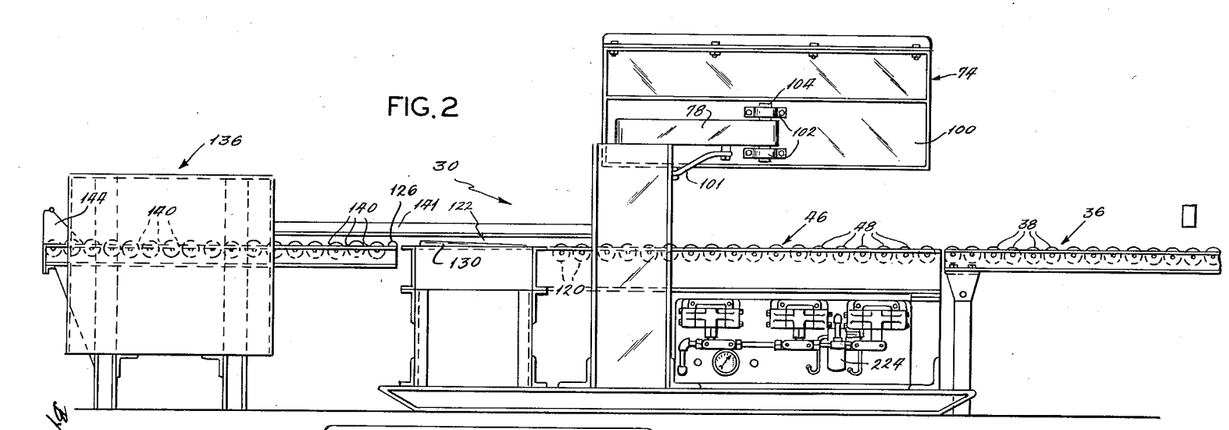
FIG. 2 is a side elevational view of the apparatus shown in FIG. 1 taken along line 2—2 therein.
Figure 24:
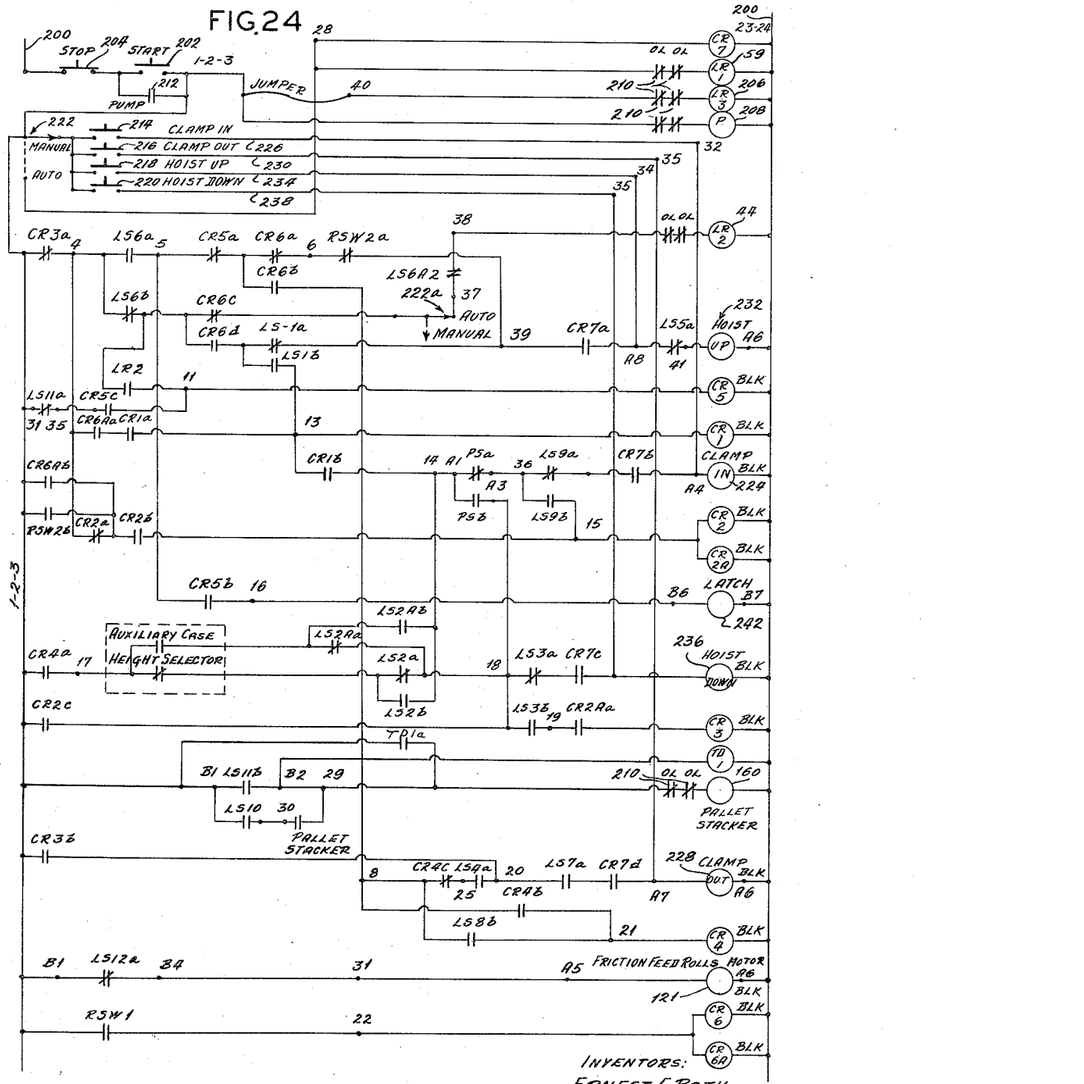
FIG. 24 is a schematic wiring diagram showing the principal electrical elements employed for controlling the present apparatus.

In an elevated position of the elevator 46, limit switch LS-1 (which has two sets of contacts and which is operated by the rotation of the cam shaft 73) de-energizes the hoist motor 52 to stop the elevator 46 and simultaneously energizes a clamps-in solenoid valve 224 through a normally closed pressure switch PSa (FIGS. 2 and 24). The pressure switch PSa (which may be of pressure relief type capable of being set to by-pass at above a given pressure) controls the supply of fluid pressure from pump 208 (FIG. 24) which operates the clamps 72 and 74. When a predetermined amount of pressure is applied by the clamps 72 and 74 on the cartons 34, the pressure switch PSa opens and allows the clamps 72 and 74 to hold and support the cartons at that pressure.

The mechanical linkages connecting the supply of fluid pressure from pump 208 with the clamps 72 and 74 are shown in FIGS. 2, 3, 19 and 22. The clamps 72 and 74 (shown in phantom in FIG. 22 for the sake of clarity) are pivotally mounted on the extended ends of arms 76 and 78 respectively, and the arms 76 and 78 are connected to turn with the upper ends of vertical shafts 80 and 82 which are positioned in structural pillars of the apparatus 30 and are located on opposite sides of the elevator 46. The lower ends of the vertical shafts 80 and 82 are connected to arms 84 and 86 respectively (see FIG. 19 for the arm 84 and lower end of shaft 80) and the extended ends thereof are connected by a common connecting rod 88. The arms 84 and 86 extend from opposite sides of their respective shafts 80 and 82 so that endwise movement of the connecting rod 88 (FIG. 22) causes the shafts 80 and 82 to rotate in opposite directions, thereby resulting in the clamps 72 and 74 either moving together or moving apart.

The drive for connecting rod 88 is through a projecting member 90 attached to the connecting rod. The projecting member 90 is connected to piston rod 92 of fluid motor 94 and the fluid motor 94 is pivotally mounted on a frame member of the apparatus 30. Each end of the motor 94 is connected by a fluid supply conduit 96 or 98 so that the piston rod 92 and the connecting rod 88 can be positively moved in both directions for opening and closing the clamps 72 and 74. When the piston rod 92 moves the connecting rod 88 toward the top in FIG. 22, the shaft 80 moves clockwise and the shaft 82 counterclockwise and the clamps 72 and 74 move together for gripping cartons 34. The contrary results when the connecting rod 88 moves toward the bottom in FIG. 22.

Figure 10:
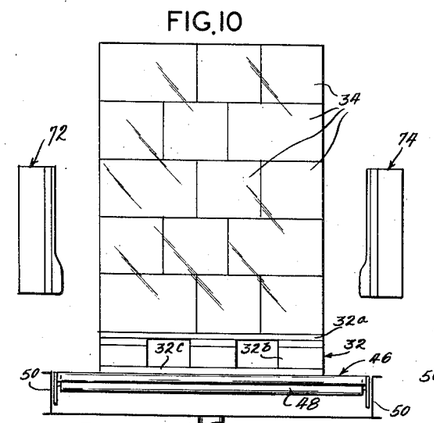
FIGS. 10 through 15 show step-by-step the operational sequence employed by the present apparatus to separate the articles from the portable platform and to separate the tiers of articles from each other.
Figure 12:
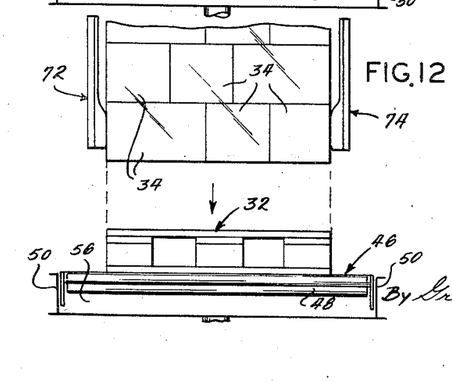
Figure 13:
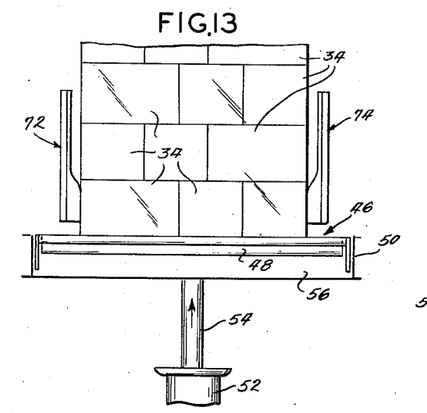
Figure 14:
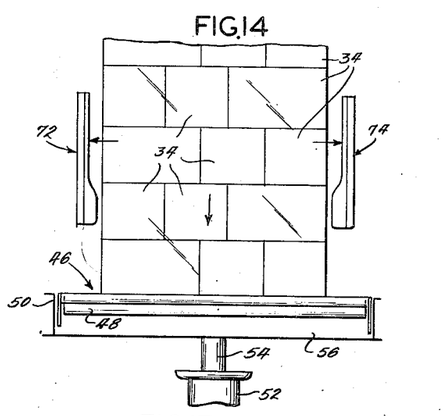

FIGS. 10, 11 and 12 illustrate the sequence of operation as the elevator 46 rises from the position of FIGS. 4 and 10 and stops at the position of FIG. 11 for the closing of the clamps 72 and 74 on the lowest tier of cartons 34, and subsequent descent of the elevator (FIG. 12) with the load retained in raised position. In FIG. 10, the elevator 46 has started to rise with a loaded pallet 32 positioned thereon; in FIG. 11, the elevator 46 has moved the loaded pallet upwardly to a height at which the lowest tier of cartons 34 can be and is engaged by the clamps 72 and 74; and FIG. 12 shows the clamps 72 and 74 holding the load of cartons 34 in an elevated position while the elevator 46 lowers the now unloaded pallet 32 in preparation for discharging the pallet so that the load can be unstacked layer by layer.

Figure 3:
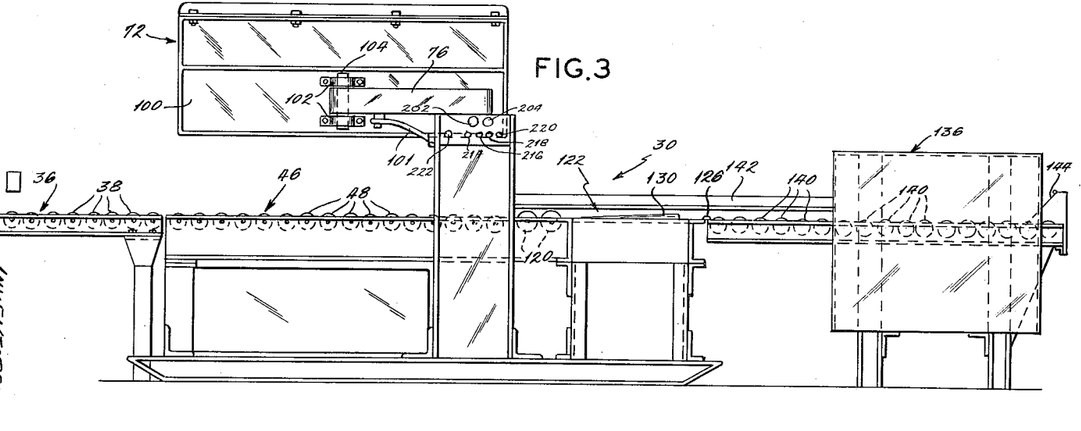
Figure 16:
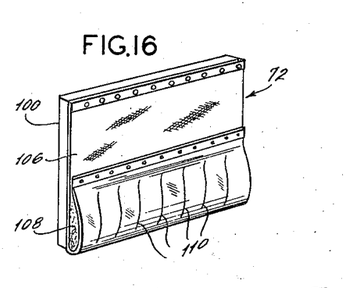
FIG. 16 is a perspective view showing in detail the construciton of one form of an article gripper member or clamp employed on the present apparatus.

The clamps 72 and 74 are pivotally mounted on the swivel arms 76 and 78 to enable them to adjust their positions to the shape of the load and to more evenly distribute the clamping force over the surfaces of the load. The details of construction of the clamps 72 or 74 are shown in FIG. 16. The clamps 72 and 74 have backing plates 100 which are hingedly mounted on the arms 76 and 78 respectively by hinge members 102 and hinge pins 104 (FIGS. 2 and 3). Preferably the backing plates 100 are hinged about midway of their horizontal dimensions and nearer their lower edges where the greatest force is applied. Also means to keep the clamps moving in substantially parallel cooperation are provided in the form of bars 101 pivotally connected between the plates 100 and the frame pillars (FIGS. 2, 3). These bars 101 prevent the clamps 72 and 74 from making exaggerated movements which might interfere with their operation.

The carton engaging sides of the backing plates 100 are covered with rough surface rubber or plastic material 106 which has high frictional characteristics in order to prevent slippage with the load being supported. Yieldable padding 108 is positioned between the material 106 and the backing plates 100 to enable the clamps 72 and 74 to adjust to the contour of the load. Any suitable padding such as sponge rubber, ordinary rubber, plastic, etc. can be used for this purpose. The high friction material 106 in the zone of the padding 108 are provided with a plurality of slits 110 to still further enable the clamps 72 and 74 to adjust to the contour characteristics of the load. It is contemplated that the padding 108 might extend over the entire area of the backing plates 100 or over only the lower, upper, or central portions thereof depending upon the characteristics of the articles that the clamps 72 and 74 are intended to support. Another alternate arrangement is to provide spaced pads 108 on the backing plates, depending on the load being clamped.

The lower end of the vertical shaft 80 associated with clamp 72 (FIGS. 19 and 22) carries a sprocket gear 112 which is cooperatively engaged by a continuous link chain 114. The link chain 114 extends around sprocket gear 116 which is mounted on a vertical cam shaft 118 in the control unit 77, and the cam shaft 118 carries a plurality of cams which operate associated limit switches (LS6, 6A, 7, 8 and 9) as the clamps 72 and 74 move in and out. The limit switches which are controlled by the cam shafts 118 and 73 are more fully considered hereinafter in connection with the description of the circuit diagram shown in FIG. 24. At this point, it is sufficient to note that vertical movement of the elevator 46 operates the cam shaft 73 and in and out movement of the clamps 72 and 74 operates the cam shaft 118.

While the clamps 72 and 74 are engaging the lowest tier of cartons (after the loaded pallet 32 has been raised) (FIG. 12), the elevator 46 is actuated and lowers the pallet 32. As soon as the elevator 46 reaches the bottom of its travel (which is the position in which the elevator rolls 48 are level with the input conveyor rolls 38), the brake shoe 60 is disengaged from the rolls 48 and becomes inoperative (FIG. 21), and the elevator rolls 48 are again rotated by engagement with the drive belt 58 (FIG. 20). The elevator rolls 48 advance the pallet 32 to the left (FIG. 6) where the pallet engages two friction rolls 120 which at this time are rotating and assist the leftward movement of the pallet 32 across the carton discharge bed 122 (FIGS. 4, 5 and 6).

*Carton Discharge Bed*

The carton discharge bed 122 is formed of spaced rolls 124 positioned at right angle to the forward movement of the pallet 32 and the rolls 124 are at a lower elevation than the rolls 48 and 120. Furthermore, the edge of the discharge bed 122 opposite from the friction rolls 120 (FIGS. 1, 6, 7, 8 and 9) is defined by a bumper roll 126 which projects above the level of the rolls 124 and which is used for stopping and aligning cartons 34 in the bed 122 as will be shown hereinafter. However, when a pallet 32 is crossing the bed 122, the bumper roll 126 helps to support the pallet as it crosses.

A rack 128 formed of rolls 130 (FIGS. 1, 4, 5, and 23) extends across the bed 122, and the rolls 130 are positioned between the bed rolls 124. The rack 128 is pivoted near the right side of the bed 122 (FIGS. 4 and 5) and the rolls 130 extend angularly and upwardly across the bed 122. The right ends of the rolls 130 (FIG. 4) are approximately level with the bed rolls 124 and the left ends thereof are approximately level with the bumper roll 126. The rack 128 is suitably counterbalanced by a weight 132 so that it normally extends angularly, as described, across the bed 122. While an unloaded pallet is crossing over the bed 122, the control circuits for the apparatus energize a latch solenoid 242 (shown schematically in FIG. 24) which operates a suitable latch to retain the rack 128 in its angular extended position and to prevent the rack 128 from lowering. Thus, as the pallet 32 moves across the bed 122, it is guided by the rack 128 so as to ride on and over the bumper roll 126.

*Pallet Stacker*

Figure 17:
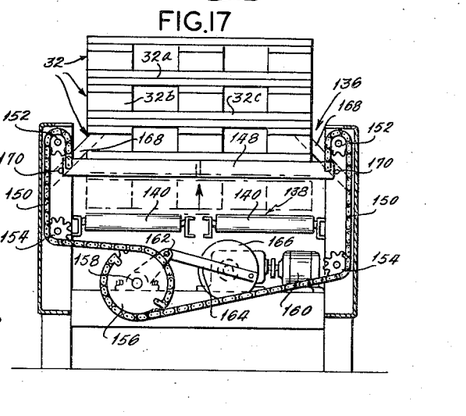
FIG. 17 is a cross-sectional view taken along line 17—17 in FIG. 1 showing the details of construction of the portable platform stacker employed on the present apparatus, and illustrating in solid and phantom outline the limits of movement of a portable platform therein.

To the left of the bumper roll 126 (FIG. 9) is a pallet stacker 136 for stacking the unloaded pallets 32. The details of construction of the stacker 136 are shown in FIGS. 1, 2, 3, 7, 8, 17 and 18. Like the input conveyor 36, the stacker 136 has a bed formed by two similar parallel tracks 138 of spaced rolls 140 (FIGS. 1 and 17). Neither track 138 is shown driven, although either or both could be.

Curved guide rails 141 and 142 (FIG. 1) are provided on opposite sides of the entrance to the stacker 136 to insure proper alignment of each pallet 32 entering the stacker. Each pallet 32 moves into the stacker 136 due to the momentum it received from the friction rolls 120. The pallets 32 move all the way into the stacker 136 and bump into the far wall 144 thereof (FIGS. 1, 7 and 8). The wall 144 is pivoted near its upper edge and is biased toward the incoming pallets 32 and can move when bumped by a pallet 32 to act as the operating lever for limit switches LS11a and LS11b which control certain operations of the stacker 136 and elevator 46.

Each stacker track 138 has a plurality of the spaced rolls 140 which form the stacker platform. A grid 148 (FIGS. 1, 7, 8 and 17) formed of cross members is positioned between and below rolls 140 of the stacker bed so that the incoming pallets 32 move into the stacker 136 on the rolls 140. The grid 148 (FIG. 17) is connected at four positions along the sides of the stacker 136 by link chains 150 which extend upwardly from the grid 148, around sprocket wheels 152, when downwardly around idler sprockets 154, and finally are connected to driven sprocket wheels 156. One driven sprocket wheel 156 is provided for each two link chains 150 and the two sprocket wheels 156 are mounted on a shaft 158 which is rotated by a stacker motor 160. The stacker motor 160 is connected to the shaft 158 by a crank arm 162, a crank rod 164, and a flywheel 166. When the stacker motor 160 is energized, after a pallet has bumped wall 144, it moves the crank rod 164 through a complete cycle, thereby moving the arm 162 on the shaft 158 back and forth causing the grid 148 to be raised and then lowered.

Figure 18:
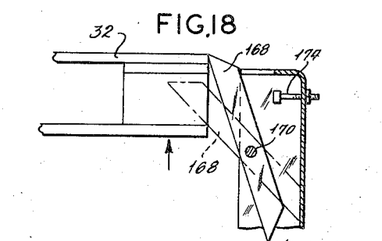
FIG. 18 is an enlarged fragmentary view, partly in section, illustrating by solid and phantom lines two positions of a platform support member employed on the platform stacker.

As the grid 148 rises, it moves the pallet upwardly into engagement with pallet support fingers 168 (FIGS. 17 and 18) mounted to opposite sides of the stacker 136. Two such fingers 168 are shown on each side of the stacker 136 (FIG. 1). The fingers 168 are pivotally mounted in an off-center manner on shafts 170 positioned in slots in the side frame of the stacker 136 (FIG. 18). The upper ends of the fingers 168 are beveled and due to the off-center mounting project angularly over the stacker tracks 138. The lower ends of the fingers 168 are also beveled and engage the walls of their associated slots.

When a pallet 32 bumps into the wall 144 and operates the limit switches associated therewith, it is in position to be stacked. The grid 148 then rises and moves the pallet 32 off of the rolls 140 and against the fingers 168. As the pallet continues to rise, the upper portions of the fingers 168 drag along the sides of the pallet 32 until finally the pallet 32 moves past the fingers 168, and the fingers 168 drop back by gravity beneath the pallet. During lowering of the grid 148, the fingers 168 support the pallet 32 in its elevated position and the grid 148 returns to its down position so that the succeeding pallets 32 can enter the stacker 136 beneath the previously stacked pallets and be stacked in like manner. As each subsequent pallet 32 enters the stacker 136, it is lifted and in turn lifts the preceding pallet until a desired stack has been accumulated. In the drawings (FIG. 17), the fingers 168 are shown after they have dropped back and are supporting the pallet beneath the upper surface of the pallet. The pallet construction shown in this specification is employed for illustrative purposes only and it is contemplated that many other types of portable platforms can be used as well.

Adjustable screws 174 (FIGS. 1 and 18) are provided in the finger slots. The screws 174 limit the angular displacement of the fingers 168 and by so doing help to align the pallets as they are stacked because the pallets must adjust their positions to pass between the fingers 168 positioned on opposite sides of the stacker 136.

Simultaneously with the energizing of the stacker 136 (by a limiting switch which is actuated when a pallet 32 bumps the end wall 144) is the energizing of the hoist 52. The hoist 52 is energized by another limit switch LS11a under control of the end wall 144 and moves the elevator 46 upwardly, thereby saving machine time because the elevator 46 and the stacker 136 operate simultaneously. The motor 160 makes one revolution whereupon LS10 is actuated and stops the motor 160.

*Elevator and Clamp Operation*

After the pallet 32 bumps the stacker wall 144 and energizes the hoist 52, the elevator 46, which is empty, rises (FIG. 7). Since the elevator 46 is empty, the switch rolls 68 and 190 (FIG. 1) project above the level of the elevator rolls 48 and the associated roll switches RSW-1 and RSW-2 are in inoperative condition. The elevator 46 moves upwardly until the switch rolls 68 and 190 engage and are depressed against the bottom side of the lowest tier of cartons 34 being supported between the clamps 72 and 74. As the rolls 68 and 190 are depressed level with the elevator rolls 48, they actuate their associated roll switches RSW-1 and RSW-2 de-energizing the hoist 52 and stopping the elevator 46. With the hoist 52 de-energized and the roll switches RSW-1 and RSW-2 actuated, clamps-out solenoid 228 is energized and causes the clamps 72 and 74 to move apart and release the cartons so that the cartons settle on the elevator 46.

As the clamps 72 and 74 move apart, cam shaft 118 positioned in the control unit 77 rotates and operates the various limit switches associated therewith. When limit switch LS8 is operated by cam shaft 118, its contacts open the circuit to the clamps-out solenoid 228, and stop the outward movement of the clamps 72 and 74.

Figure 15:
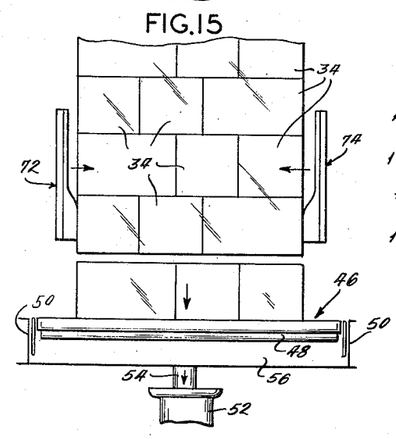

With the cartons now resting on the elevator 46 and with the clamps 72 and 74 free of the cartons, the hoist 52 is again energized. This time, however, the hoist 52 is energized by hoist-down solenoid 236 instead of by hoist-up solenoid 232 and the elevator 46 moves down. The hoist-down solenoid 236 is energized by relay contacts CR4a which are closed when limit switch LS8b, which is controlled by cam shaft 118, energizes relay CR4. The downward movement of the hoist 52 is stopped by limit switches LS2 and LS2A which are operated by cam shaft 73. While the hoist 52 and the elevator 46 are stopped, the clamps 72 and 74 move toward each other and engage the second lowest tier of cartons (FIGS. 8 and 15). The operation of the clamps 72 and 74 in engaging the second lowest tier of cartons is also under control of the limit switches LS2 and LS2A on the cam shaft 73 and are controlled by the position of the elevator 46.

While the clamps 72 and 74 are engaging the second to the lowest tier of cartons 34, the elevator 46 moves downwardly with only the lowest tier of cartons 34 thereon. When the elevator 46 is in its bottom position, the elevator rolls 48 again engage the belt 58 (FIG. 20) and move the lowest tier of cartons leftwardly (FIG. 9).

*Operation of Carton Discharge Bed*

The leftmost row of cartons 34 is first to move into engagement with the friction drive rolls 120 and be advanced thereby into the carton discharge bed 122. In moving into the discharge bed 122, the cartons 34 move onto the rolls 130 (FIGS. 4 and 5) which lowers under the weight of the cartons to a position even with the bed rolls 124. There is no circuit at this time for energizing the latch solenoid 242 as there was when pallet 32 moved across the bed 122, and therefore, the rack 128 is able to lower under the weight of the cartons 34 until the cartons are resting on the discharge bed rolls 124. The reasons the latch solenoid 242 is not energized at this time are discussed hereinafter in detail in connection with the description of the circuit diagram.

Sufficient forward momentum is imparted to the cartons by the friction rolls 120 as they move onto the discharge bed 122 to move the cartons across the bed 122 and against the bumper roll 126. By moving against the bumper roll 126, the cartons are properly aligned in the discharge bed 122 for the succeeding operations.

The lowering of the rack 128 in the discharge bed 122 actuates limit switch LS12 located under the bed 122. The limit switch LS12 is in the circuit which energizes the motor (not shown) for the friction drive rolls 120 and when actuated stops the motor and prevents the rolls 120 from advancing any more cartons 34 into the bed 122 until the bed 122 is cleared of the cartons 34 already therein.

The rolls 124 of the carton discharge bed 122 are continuously driven from below by a powered belt 176 (FIGS. 1, 4, 5, 6, 7 and 8). Therefore, as cartons 34 move onto the bed 122 they move toward the bottom in FIG. 23 through a carton aligning device and then onto any suitable conveyor 178.

*Carton Aligning Device*

Figure 23:
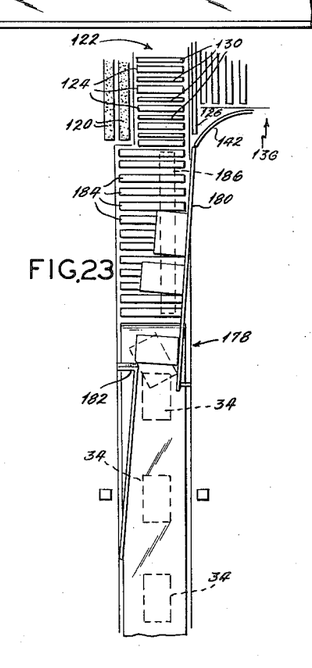
FIG. 23 is a fragmentary top plan view of the present apparatus and shows especially the article discharge conveyor apparatus, illustrating in phantom the movement of a carton into proper alignment.

The aligning device arranges the cartons as they enter the conveyor 178 so that they all face in the same direction for later handling. The aligning device consists of a guide rail 180 (FIGS. 1 and 23) which extends angularly part way over the conveyor 178. The cartons 34 which are aligned along one side of the bed 122 by bumping the bumper roll 126 are guided by the guide rail 180 as they move into the conveyor 178. The cartons 34 which have a side surface engaging the rail 180 are in proper alignment and so move into the conveyor 178, but the cartons 34 having an end surface engaging the rail 180 are guided by the rail 180 so that their forward side surfaces bump an abutment 182 which extends part way over conveyor 178 from the opposite side thereof (FIG. 23). The spacing between the guide rail 180 and the abutment 182 is sufficient to pass cartons positioned lengthwise on the conveyor 178 but is insufficient to pass cartons positioned crosswise thereon. Therefore, the crosswise extending cartons 34 must make a 90 degree turn while engaged with the abutment 182 before moving on. FIG. 23 illustrates in phantom the movements of a carton while being aligned by the aligning device.

The conveyor 178 is formed by spaced rolls 184 which are driven from below by belt 186 (FIG. 23). Since the operation of the aligning device is somewhat dependent on the speed of belt 186 and the engagement that the belt 186 makes on the rolls 184, it is important that the belt be properly adjusted.

As soon as the last carton in a row has moved off of the rack rolls 130, the rack 128 rises due to its counterbalance 132 (FIGS. 4 and 5) and limit switch LS12 which is controlled by the movement of the rack 128 re-energizes the drive motor for the friction drive rolls 120. Since all of the cartons 34 on the elevator 46 are simultaneously moved forwardly by the elevator rolls 48, and since the elevator rolls 48 do not stop when the friction rolls 120 stop, the second row of cartons are already engaged with the friction rolls 120 when they restart and move into the discharge bed 122. As the second row of cartons in the tier move into the discharge bed 122, the rack 128 again lowers and stops rolls 120 and the discharge procedure is repeated for the second row. When the final row of the tier has moved onto the carton discharge bed 122, the rolls 68 (and the rolls 190) of the switch actuating devices on the elevator 46 are released and move upwardly. The release of the rolls 68 actuates the roll switch RSW-1 and energizes the hoist 52 to raise the elevator 46. The elevator 46 again moves upwardly until stopped when the rolls 68 and 190 are depressed against the bottom of the second tier of cartons.

The operations of separating, discharging and aligning the cartons in the second lowest tier are the same as described above for the lowest tier and these operations repeat themselves tier after tier until the final or top tier is discharged from the apparatus.

Before the final tier has been discharged, and while the final tier is being lowered by the elevator 46, the clamps 72 and 74 come together as if to clamp the next higher tier. Since there is no next higher tier, the clamps 72 and 74 move inwardly to the limit of their travel and actuate limit switch LS9 which conditions the machine to feed in another loaded pallet as soon as the last row of cartons in the top tier has moved into the carton discharge bed 122. The signal for this operation is initiated by the release of the switch rolls 68 as the last row of cartons in the top tier is fed from the elevator 46.

The switch actuating device consisting of the rolls 190 and arms 192 which operate the roll switch RSW-2 is provided as a saftey measure to insure that stray cartons 34 are not accidentally left on the elevator 46 to cause a jam when the elevator 46 rises. Normally, the switch rolls 190 are counterbalanced to extend above the elevator rolls 48 as are switch rolls 68, and are actuated by moving downwardly whenever a pallet or carton is positioned thereon. When depressed, they actuate roll switch RSW-2 and prevent the hoist-up solenoid 232 from being energized.

From the time a loaded pallet initially moves onto the elevator 46 until the last carton has been discharged from the apparatus, the input conveyor motor 44 remains de-energized, having been de-energized by relay contact CR6c under control of the roller switch RSW-1. It is contemplated, however, that motor 44 could be controlled by a photocell or switching device (not shown) which will keep the motor 44 energized until a loaded pallet is in position to enter the apparatus.

*Electrical circuits*

The electrical circuit for the unloading apparatus or depalletizer 30 is shown in FIG. 24 and a detailed description thereof including the sequence of operation follows. The description of the circuit and its operation should be considered in conjunction with the sequence chart of FIG. 25 which shows the relative time relationships of the more important components.

Consider the apparatus 30 as being empty at the start of a run. A pallet 32 loaded with objects such as cartons 34, is waiting on the input conveyor 36 to enter the apparatus 30.

In this specification, abbreviations are employed to describe certain of the elements in the electrical circuit. For example, the abbreviation RSW with a number refers to the switches operated by the switch rolls 68 or 190; the abbreviation LS with a number refers to a limit switch (and the addition of a letter after the number refers to a particular set of contacts on that limit switch); CR and a number refers to a relay; and CR with a number and a letter refers to a particular set of contacts associated with that relay. The relays and the limit switches LS-1 through LS-9 are located in the control unit 77 (FIG. 19). The other limit switches are mounted about the apparatus near the part which operates them.

The electrical circuits for the apparatus 30 are connected to a power supply by input leads 200. A normally open start switch 202 and a normally closed stop switch 204 are connected in series across the line with the discharge bed drive motor 206 for the belt 176. Normally closed photocell contacts (not shown) may also be connected in series with motor 206 to keep the motor 206 energized on completion of unloading a pallet and indicates if the output conveyor 178 is fully loaded or not. The belt 176 drives the rolls 124 in the discharge bed 122. Also connected in series with the start and stop switches 202 and 204 across the input leads 200 is a pump 208 which controls the supply of fluid pressure for the hoist 52 and the fluid motor 94 for actuating the clamps. Suitable overload switches 210 are connected in series with the discharge bed motor 206, the pump 208 and with certain other elements as shown. Normally open contacts 212 (which close when the pump is energized) are connected across the start switch 202. The contacts 212 close when the apparatus is started and maintain the apparatus in an energized condition until the stop switch 204 is operated.

*Manual Control Circuits*

Four normally open manual switches 214, 216, 218 and 220 are connected to one side of the line through manual-automatic control switch 222 and through the start and stop switches 202 and 204. The manual-automatic switch 222 is shown in solid lines in its manual position and is shown in dotted lines in its automatic position.

The manual switch 214 is the "clamp-in" switch and is connected by lead 226 to a "clamp-in" solenoid valve 224. Similarly, manual switch 216 is the "clamp-out" switch and is connected by lead 230 to "clamp-out" solenoid valve 228; manual switch 218 is the "hoist-up" switch and is connected by lead 234 to "hoist-up" solenoid valve 232 through LS5a; and manual switch 220 is the "hoist-down" switch and is connected by lead 238 to "hoist-down" solenoid valve 236. These switches and their associated solenoid valves provide individual manual control for the operations of the hoist 52 and the clamps 72 and 74 and are used for cycling and trouble shooting the apparatus 30.

The manual control switches 214, 216, 218, and 220, the manual-automatic switch 222, and the start and stop switches 202 and 204 are mounted on one of the clamp supporting pillars of the frame, such as the pillar associated with the clamp 72 (FIG. 3). It is anticipated, however, that the switches could be mounted on the pillar associated with the clamp 74 or in any convenient location either on or off the apparatus 30 without departing from the spirit of the invention. Furthermore, the manual switches 214, 216, 218 and 220 are connected directly to the components which they control and can be operated in any sequence when the manual-automatic switch 222 is set to manual.

*Automatic Control Circuits*

Automatic operation of the depalletizer 30 is under control of the manual-automatic switch 222 (including ganged switch 222a) when switched to the automatic position. In the automatic position the manual switches 214, 216, 218, and 220 are inoperative and circuits are established through the switches 222 and 222a which automatically control the operations of the apparatus. When set to automatic operation, the depalletizer or unloader apparatus 30 exclusively and automatically handles the pallets 32 and the objects or cartons 34 being removed therefrom.

Figure 25:
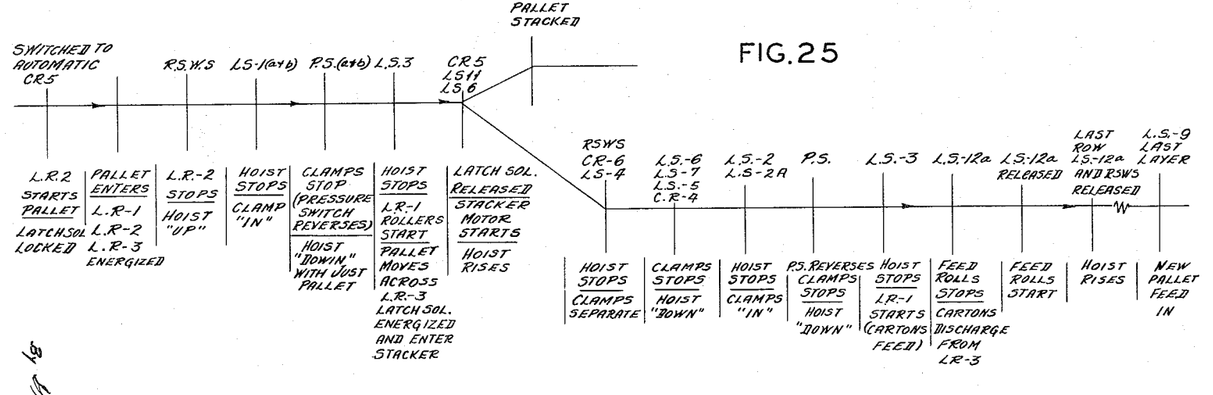
FIG. 25 is a sequence chart showing the relative time and motion relationships of the different operations of the present apparatus including the energizing and de-energizing of principal switches.

The following detailed description of the circuits which automatically control the operations should be considered with reference to the sequence chart shown in FIG. 25 wherein the sequence of operations of unloading a pallet 32, stacking the pallets, and discharging the cartons 34 onto the conveyor 178 are shown.

With the apparatus 30 turned on and set to automatic operation, and with the machine clear of pallets and cartons, a circuit is established that energizes the motor 44 for driving rolls 38 in the input conveyor 36. The circuit (FIG. 24) is from the input conveyor bed motor 44 through the normally closed LS-6A$_2$ contacts, through the manual-automatic switch 222a (closed on automatic operation), through relay CR6c (normally closed contacts which are closed when the elevator 46 is empty), through LS6b normally closed contacts which are closed when the clamps are apart (FIG. 26) through relay contacts CR3a which are normally closed, and to the input line lead 200 via the start and stop switches 202 and 204. The abbreviation LR and a number refers to the various driven beds on the apparatus 30. For example LR-2 refers to the input conveyor bed and is also designated 44 in FIG. 24. The CR6c relay contacts are closed because there are no pallets 32 or cartons 34 resting on the switch rolls 68 to operate roller switch RSW–1. CR3a (normally closed relay contacts) are also closed at this time because relay CR3 is de-energized, depending for its energization on the closing of the normally open CR2Aa contacts, which remain open until the clamps 72 and 74 move inwardly after the final or top layer of cartons are resting on the elevator 46. Thus, with the input conveyor 36 energized, a loaded pallet 32 enters onto the elevator 46.

When a loaded pallet moves onto the elevator 46, the elevator is in the down position, and the drive belt 58 engages and rotates the elevator rolls 48 to advance the pallet thereon. The drive motor 59 for the belt 58 is connected in series across the line leads 200 with the start and stop switches 202 and 204 and operates at all times when the apparatus is turned on. LR–1 refers to the elevator in FIG. 24.

The incoming pallet moves across the elevator 46, and in so doing, the pallet engages and depresses the rolls 68 and 190. The depression of the rolls 68 and 190 operates to actuate the roll switches RSW–1 and RSW–2 respectively. When switch RSW–1 is actuated, its contacts close and energize relays CR6 and CR6A (FIG. 24). When relay CR6 is energized, the CR6c contacts open and de-energize the input conveyor motor 44 to prevent any further pallets from entering the apparatus.

Also, when relay CR6 is energized, its CR6d (normally open) contacts close and energize the hoist-up solenoid valve 232. The circuit for energizing the hoist-up solenoid valve 232 is from the right hand line lead 200 (FIG. 24), through the coil of solenoid valve 232, through the mechanically closed contacts of limit switch LS5a which are closed when the elevator 46 is down, through the normally open relay contacts CR7a which are closed at all times during automatic operation, through the normally closed limit switch contacts LS1a which are closed except when the hoist is near the top of its travel (FIG. 27), through the normally open relay contacts CR6d which were closed when the RSW–1 switch energized relay CR6, through the normally closed limit switch contacts LS6b which are closed because the clamps 72 and 74 are still open (FIG. 26), and through the normally closed relay contacts CR3a to the other side of the line. The energizing of the hoist-up solenoid 232 activates the hoist 52 and moves the elevator 46 upwardly (with the loaded pallet thereon) until the circuit just described is interrupted when the mechanically closed limit switch contacts LS1a open. The LS1a contacts open when the elevator 46 has been raised so that the clamps 72 and 74 are level with the lowest tier of cartons 34 (FIG. 27).

Limit switch LS1a is actuated by a cam on cam shaft 73 (FIG. 19) and has a second set of mechanically open contacts LS1b which close by the same operation and energize the clamp-in solenoid 224. The circuit for energizing the clamp-in solenoid 224 is through the normally open relay contacts CR7b, through the mechanically closed limit switch contacts LS9a which are closed except when the clamps 72 and 74 move inwardly to test when the last layer of cartons 34 are on the elevator 46, through normally closed pressure switch contacts PSa, through the normally open relay contacts CR1b which are now closed because relay CR1 is energized by a circuit established by the closing of mechanically opened limit switch contacts LS1b, through the mechanically open limit switch contacts LS1b, through normally open relay contacts CR6d which are now closed because a pallet is resting on the switch rolls 68, through the normally closed limit switch contacts LS6b which are closed when the clamps 72 and 74 are open, and through relay contacts CR3a to the other side of the line. With the clamps-in solenoid 224 energized, the clamps 72 and 74 move inwardly and engage opposite sides of the lowest tier of cartons 34. The clamps 72 and 74 press against the cartons 34 until a predetermined amount of pressure is applied. When the applied pressure reaches its predetermined value, it actuates mechanism (not shown) which opens the pressure contacts PSa and closes pressure contacts PSb. Actuation of the pressure switch contacts PSa and PSb is determined by an adjustment (not shown) which controls the amount of pressure to be applied by the clamps 72 and 74 on the sides of the cartons 34. When the clamps apply this predetermined amount of pressure, the pressure switch contacts PSa and PSb are actuated as described.

The opening of the PSa contacts opens the circuit to the clamps-in solenoid 224 and the closing of the PSb contacts closes a circuit to energize hoist-down solenoid 236. The circuit to energize the hoist-down solenoid 236 is from the line through the coil of the solenoid 236, through the normally open relay contacts CR7c, through mechanically closed limit switch contacts LS3a which are closed at all times except when the elevator 46 is at its bottom position (FIG. 27), through the PSb normally open pressure contacts, through normally open relay contacts CR1b, through normally open relay contacts CR1a which are the hold contacts for relay CR1, through normally open relay contacts CR6Aa which are closed because a pallet is resting on the switch rolls 68 and through normally closed relay contacts CR3a to the line.

The hoist 52 moves the elevator 46 down with the empty pallet 32 and the cartons 34 are supported in their elevated position by the clamps 72 and 74. When the elevator 46 reaches the bottom of its travel, the mechanically closed limit switch contacts LS3a open to de-energize the hoist-down solenoid 236 and to stop the elevator 46. At the same time, the elevator rolls 48 engage the belt 58 and resume rotation to move the empty pallet 32 toward the friction drive rolls 120. The friction drive rolls 120 are rotated by motor 121 (shown schematically only in FIG. 24) which is under the control of normally closed limit switch contacts LS12a and the rack 128 located in the discharge bed 122. The rack 128 is latched in the up position at this time (as will be shown), and contacts LS12a are closed. Therefore, the rolls 120 rotate and advance the pallet across the discharge bed 122 and into the stacker 136. The circuit that energizes the latch solenoid 242 to hold the rack 128 up so that the pallet 32 can move across the discharge bed 122 depends on relay CR5 being energized. When the input conveyor 36 was operating to initially feed a loaded pallet into the apparatus, normally open contacts LR2 associated with the input conveyor 36 were closed and energized relay CR5. With relay CR5 energized, the normally open relay contacts CR5b are closed and together with normally open limit switch LS6a (which closes when the clamps move in) holds latch solenoid 242 energized and the rack 128 latched in its up position. In the latched condition of the rack 128, the rack rolls 130 extend angularly over the discharge bed 122 and guide the empty pallets into the stacker 136. Relay CR5 is held energized by its own normally open relay contacts CR5c and by normally closed stacker contacts LS11a. When the pallet enters the stacker 136 and bumps into the stacker end wall 144, it actuates the stacker contacts LS11a and de-energizes relay CR5 and the latch solenoid 242. Relay CR5 is prevented from being re-energized until the input conveyor 36 is re-energized to feed the next loaded pallet.

When the pallet 32 bumps the stacker end wall 144, it actuates the limit switches LS11a and LS11b. As shown, the limit switch SL11a de-energizes relay CR5, the latch solenoid 242 and energizes the hoist-up solenoid 232 (by means of the normally closed relay contacts CR5a); and the limit switch LS11b energizes the stacker motor 160 and the delay relay TD1 which controls the timing of the stacker 136. As soon as the pallet is raised off of the stacker rolls 140, the contacts LS11a and LS11b are released since the pallet no longer engages the wall 144, and the delay relay TD1 takes over control of the stacker motor 160. Operation of the stacker motor 160 moves the grid 148 through a stacking cycle under the control of the time delay relay contacts TD1a. In making the stacking cycle, the motor moves the grid 148 and raises the pallet above the fingers 168 and then lowers the grid 148 below the level of the stacker rolls 140 leaving the pallet 32 supported on the fingers 168.

The circuit which energizes the hoist-up solenoid 232 at the same time as the stacker motor 160 is through the hoist-up solenoid 232, through the mechanically closed limit switch LS5a which is closed except when the hoist is at the top of its travel, through the normally open CR7a contacts, through the normally closed RSW–2a contacts which are closed because the elevator 46 is empty, through the normally closed CR6a contacts which are closed because there is nothing resting on the elevator 46 to actuate RSW–1 and relay CR6, through the normally closed CR5a contacts which are closed because of the release of the stacker contacts LS11a, through the limit switch LS6a contacts which are closed with the clamps 72 and 74 engaging the cartons 34 (FIG. 26), and through relay contacts CR3a. The platform 46 rises this time until stopped by the rolls 68 and 190 engaging bottom side of the lowest layer of cartons 34 and actuating the switch contacts RSW–1 and RSW–2a. When this occurs the circuit to the hoist-up solenoid 232 is opened by the RSW–2a contacts and the relay contacts CR6a which are controlled by RSW–1 and relay CR6.

With the elevator 46 engaging the underside of the supported cartons, a circuit is completed to energize the clamps-out solenoid valve 228 in order to release the cartons onto the elevator 46. The circuit is through the clamps-out solenoid 228, through normally open relay contacts CR7d which are closed during automatic operation, through limit switch LS7a which is closed when the clamps are off home position, through limit switch LS4a which is closed when the hoist is in its up position (FIG. 27), through the normally closed relay contacts CR4c, through normally open relay contacts CR6b which are closed with the elevator 46 engaging the bottom of the cartons 34 and actuating RSW–1, through the normally closed relay contacts CR5a, through the limit switch LS6a which is closed when the clamps 72 and 74 are engaged with the cartons 34 (FIG. 26), and through relay contacts CR3a to the other side of the line. The energized clamps move apart until the limit switch LS8b energizes relay CR4, and the relay contacts CR4c de-energize the clamps-out solenoid 228.

Once the clamps are open, the pressure switch contacts PSa and PSb return to their normal conditions. The normally open PSb contacts prevent the re-energizing of the hoist-down solenoid valve 236 through the circuit previously described therefor, but instead relay CR4 is energized by the limit switch LS8b which is closed when the clamps open to their predetermined position (FIG. 27). The normally open relay contacts CR4a permit the re-energization of the hoist-down solenoid valve 236 through the circuit consisting of CR7c, limit switch LS3a, normally closed photocell contacts, if used, limit switch LS2a, the mechanically closed auxiliary case height selector contacts if used, and through relay contacts CR4a. The circuit to energize relay CR4 is through the following: LS8b, CR6b, CR5a, LS6a, and CR3a. The hoist moves downwardly until the LS2a contacts are released and open (FIG. 27). The releasing of the contacts LS2a is timed to occur when the elevator 46 has lowered the cartons 34 a distance equal to one carton height.

When the elevator 46 stops, a circuit is available to energize the clamp-in solenoid 224. The circuit is through relay contacts CR7b, through limit switch LS9a, through PSa now closed, through limit switch LS2Ab which is closed when the hoist is in the position above described, through the normally open auxiliary case height selector contacts which are now closed (if used), and through relay contacts CR4a to the line. During the last hoist-down and clamps-in operations, a circuit was available to keep relay CR4 energized. This circuit is through relay CR4, through relay contacts CR4b, through relay contacts CR6b which are closed with cartons on the platform 46, through relay contacts CR5a, through limit switch LS6a, and through relay contacts CR2a to the line.

When the clamps 72 and 74 again engage the cartons 34, the pressure switch contacts PSa and PSb reverse, and the PSa contacts de-energize the clamps-in solenoid 224 and the PSb contacts energize the hoist-down solenoid valve 236. The circuit for energizing the valve 236 is through the relay contacts CR7c, through limit switch LS3a, through PSb contacts, through limit switch LS2Ab, through the normally open auxiliary case height selector contacts (if used), and through CR4a to the line. It is now apparent that the action of the LS2 and LS2A contacts produce the alternate operations of the clamp-in solenoid 224 and hoist-down solenoid 236 which enables the lowest tier in the group being supported to be separated out. With the hoist-down solenoid 236 energized, the elevator 46 moves downwardly to the bottom of its travel where the releasing of limit switch LS3a de-energizes the hoist solenoid 236.

In the down position the elevator rolls 48 again engage the drive belt 58 and move the cartons 34 toward the friction drive rolls 120. The forwardmost row of cartons 34 in the layer engage the rolls 120 and are advanced thereby into the discharge bed 122. At this time, the latch solenoid 242 on the discharge bed rack 128 is de-energized because relay CR5 is de-energized and the cartons depress the rack 128 and operate limit switch LS12a to open the circuit to the friction drive rolls 120. As long as cartons 34 remain on the rack 128, the LS12a contacts remain open and no more cartons can be fed onto the discharge bed 122 because the stoppage of rolls 120 acts as a brake on the cartons being moved by rolls 48.

Once the first row of cartons has moved off of the discharge bed 122 onto the conveyor 178, the rack 128 is released and the contacts LS12a again close and allow rolls 120 to pick up and advance the succeeding row of cartons 34 into the discharged bed 122. When the last row of cartons in the layer have been discharged into the bed 122, the switch contacts RSW–1 and RSW–2 are both released. When this occurs relays CR6 and CR6A are de-energized and the operation is repeated for separating and discharging the succeeding layers of cartons 34.

The two sets of contacts RSW–1 and RSW–2 are provided with the elevator 46 instead of just one set as a safety measure, as described hereinbefore, to insure that all of the cartons or objects are removed from the elevator 46 before the elevator rises. Furthermore, for the machine to advance from one operation to another, as for example, when the cartons are being fed from the elevator 46 into the discharge bed 122, it is necessary that all of the cartons move off of the elevator 46 before the next operation takes place. If either of the sets of contacts RSW–1 or RSW–2 fails to return to its normal condition, indicated the cartons are not all off of the elevator 46, the machine will fail to go into its next operation until the elevator is cleared.

The sequence of operation for separating and discharging the second, third, fourth, etc. layers of cartons, regardless of the arrangement of the cartons in the layers, is similar to the sequence of operation described in connection with the lowest or first layer of cartons. When the next to the last layer of cartons has been discharged, the elevator 46 moves upwardly with only one layer of cartons being supported by the clamps 72 and 74. After the clamps have been released the last layer on the elevator 46, the elevator 46 lowers until stopped by the limit switch LS2 as described above. The clamps 72 and 74 then move inwardly but finding no cartons to engage, they are able to move further inwardly than when there were cartons and as they continue moving they operate limit switch LS9a which de-energizes the clamp-in solenoid valve 224. At the same time, the limit switch LS9b contacts close and energize the relays CR2 and CR2A and the CR2c contacts close.

When the final clamp-in operation has been completed, the hoist-down solenoid valve 236 is again energized, this time through CR7c, LS3a, and CR2c, and moves the hoist platform 46 to its down position. In its down position, the limit switch LS3b is closed and in conjunction with the relay contacts CR2Aa and CR2c energizes relay CR3. The relay contacts CR3a control many of the circuits to the hoist and to the clamp solenoid valves as described hereinabove and when open prevent their energization. Also, the relay contacts CR3b and the limit switch LS7a energize the clamps-out solenoid valve 238 to separate the clamps in preparation for receiving the succeeding loaded pallet therebetween. While the elevator 46 is in its down position with cartons thereon, a hold circuit is also established for the relays CR2 and CR2A through the relay contacts CR2b and through the RSW2b and the CR6Ab contacts. As soon as all of the cartons in the final layer have been discharged in the usual manner to the discharge bed 122, the switch RSW2b and the CR6Ab contacts open and de-energize relays CR2 and CR2A and the machine is then in condition to receive the succeeding pallet. At this point, the original circuit available for energizing the input conveyor feed roll motor 44 is available, the elevator 46 is in its downward position, and the roller switches RSW–1 and RSW–2 are de-energized in readiness to receive the new pallet.

Figure 26:
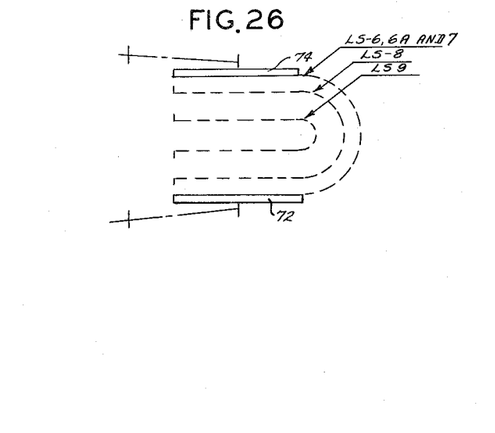
FIG. 26 is a schematic view from above showing in dotted lines the various positions of the article gripper members or clamps and indicating the positions thereof for the operation of limit switches associated therewith.

Reference has been made to FIGS. 26 and 27 throughout the description of the circuits for the unloading apparatus 30. FIG. 26 illustrates diagrammatically the positions of the clamps 72 and 74 at which the various indicated limit switches are operated. The limit switches as shown in FIG. 24 are in their normal position in the circuit diagram and should be considered as having had their contacts transferred when in the operated position. The term limit switch refers to the contacts operated by the cams on cam shafts 73 and 118.

FIG. 27 shows a similar diagram illustrating the positions of the elevator 46 at which its associated limit switches and roller switches are operated. The limit switches associated with the elevator are those indicated in FIG. 19 on the cam shaft 73. Likewise, the limit switches associated with the clamps are those indicated on the cam shaft 118.

While the invention has been described in connection with a specific embodiment thereof and in connection with specific uses, various modifications thereof will be apparent to those skilled in the art which do not depart from the spirit and scope of the invention as set forth in the appended claims. Furthermore, the terms and abbreviations used in the specification and claims are intended to have a broad interpretation. The invention has been described for the sake of convenience and clarity with reference to cartons, although it is understood that it is equally adapted to use with a variety of individual units which are suitable for stacking in superposed layers or tiers. Therefore, it is to be understood that the foregoing description and the accompanying drawings are offered only by way of illustration and example and all changes and alterations apparent to those skilled in the art which do not depart from the spirit and scope of this invention, are contemplated as being within the scope of the invention which is limited only by the claims which follow:

What we claim is:

1. Apparatus for unloading pallets loaded with articles and groups of articles arranged in vertical layers comprising an elevator positioned to receive loaded pallets, means for raising and lowering the elevator, and means for engaging and supporting the articles and groups of articles in elevated position independently of the elevator, said last named means including a pair of arms movable to and from positions extending over the elevator, and a gripper member mounted on each of said arms for engaging opposite surfaces of an article or group of articles, said gripper members having a backing member, a high friction covering for said backing member, and a layer of relatively compressible resilient material positioned between the backing member and the covering.

2. The apparatus for unloading pallets defined in claim 1 wherein each of said gripper members has a lower edge and said resilient layer extends to adjacent said lower edge.

3. The apparatus for unloading pallets defined in claim 1 wherein the covering of said gripper members is provided with slits extending therethrough.

4. The apparatus for unloading pallets defined in claim 1 wherein means are provided to control discharge of pallets and articles or groups of articles from the elevator when in a lowered position thereof, said means including a high friction roll positioned adjacent to the elevator in a lowered position thereof on the discharge side, and controlled drive means for said roll to control the starting and stopping thereof to discharge the pallet and subsequently the articles in an orderly manner for single file movement.

5. Apparatus for unloading pallets bearing stacks of articles including, in combination, an elevator having a roller bed, said elevator being movable from a down position to a raised position, drive means disposed adjacent said elevator in its down position to drive said roller bed in a direction to unload said elevator, a take-away conveyor adjacent said elevator to receive articles unloaded from said elevator, clamp means adjacent said elevator arranged to engage the stacks of articles and retain the same suspended over said elevator, said clamp means being located above said elevator down position at least a distance substantially equal to the height of articles handled by the apparatus so that the clamps effectively suspend the stacks of articles except the lowermost articles which remain on said elevator, power operated metering roll means operably disposed between said elevator in its down position and said take-away conveyor to carry articles between said elevator and conveyor, and control means operably connected to said drive means and to said metering roll means to actuate said drive means to drive said elevator roller bed to move articles off said elevator, said control means also effecting periodic operation of said metering roll means to carry articles over to said take-away conveyor in intermittent sequence such that following articles do not crowd leading articles on said take-away conveyor.

References Cited in the file of this patent

UNITED STATES PATENTS

| | | |
|---|---|---|
| 1,051,001 | Penfield | Jan. 21, 1913 |
| 2,609,113 | Huffman | Sept. 2, 1952 |
| 2,629,503 | Neja | Feb. 24, 1953 |
| 2,647,650 | Sherriff | Aug. 4, 1953 |
| 2,681,162 | Ehmann | June 15, 1954 |
| 2,702,132 | Van Doren | Feb. 15, 1955 |
| 2,769,570 | Adams | Nov. 6, 1956 |
| 2,792,133 | Warner | May 14, 1957 |
| 2,792,950 | Fenton et al. | May 21, 1957 |
| 2,858,043 | Fenton | Oct. 28, 1958 |